United States Patent [19]
Perrin

[11] Patent Number: 5,872,577
[45] Date of Patent: Feb. 16, 1999

[54] DEVICE FOR DECODING SIGNALS OF THE MPEG-TYPE

[75] Inventor: Jean-Philippe Perrin, Montreuil, France

[73] Assignee: U.S. Philips Corporation, NY, N.Y.

[21] Appl. No.: 806,871

[22] Filed: Feb. 25, 1997

[30] Foreign Application Priority Data

Feb. 28, 1996 [EP] European Pat. Off. .............. 96400424

[51] Int. Cl.⁶ ........................................................ G06F 13/16
[52] U.S. Cl. ........................ 345/521; 345/202; 345/508; 345/423; 345/718
[58] Field of Search ..................................... 345/501, 507, 345/508, 521, 202, 203, 186; 382/232; 711/157, 5; 348/423, 714–718

[56] References Cited

U.S. PATENT DOCUMENTS 5,623,314  4/1997  Retter et al. ............................. 348/423
5,712,665  1/1998  Retter et al. ............................. 345/203

FOREIGN PATENT DOCUMENTS

WO9531874  11/1995  WIPO .............................. H04N 7/30

Primary Examiner—Kee M. Tung
Attorney, Agent, or Firm—Laurie E. Gathman

[57] ABSTRACT

The invention relates to a device for decoding encoded digital signals of the MPEG-type, comprising different modules (M1, M2, M3, . . . ), provided for communicating with an external random-access memory via an arbiter (ARB) intended to control the different types of access. Storage in the memory and the method of addressing are such that the decoding operation may not only be carried out with a conventional memory (DRAM) but also with synchronous DRAM memories (SDRAM), in which the arbiter uses the same mode of communication in each case and the other modules remain unchanged.

1 Claim, 3 Drawing Sheets

DEVICE FOR DECODING SIGNALS OF THE MPEG-TYPE

BACKGROUND OF THE INVENTION

1. Field of the Invention

The invention relates to a device for decoding encoded digital signals of the MPEG-type, comprising different modules including at least an audio module and a video module, provided for communicating with an external random-access memory via an interface module referred to as arbiter and intended to control the different types of access —to a row of pixels, a row of the MPEG macroblock or a macroblock in fields of opposite parity—to decoded images.

2. Description of the Prior Art

The envisaged field of use concerns the storage of images decoded by an MPEG2 decoder in an external memory of the DRAM-type (Dynamic Random Access Memory). As is illustrated in FIG. 1, showing an MPEG2 decoder in a very diagrammatic form, different modules ($M_1$, $M_2$, $M_3$, ...) in such a decoder access an external DRAM memory via a single interface module referred to as "arbiter". This memory particularly provides the temporary storage of the compressed data stream as well as the storage of decoded images. The arbiter, denoted ARB, controls access to this external memory for the assembly of decoder modules (access required by image blocks which are to read or write information in the memory). The different modules M1, M2, M3, etc. effect different types of access to the decoded images and particularly, as illustrated in FIG. 2 three types of access:

(A) scanning per row of image pixels (denoted BLP);
(B) scanning per row of MPEG macroblock (denoted BLM);
(C) access to a macroblock in a field of a given parity and to the corresponding macroblock in the field of the opposite parity, denoted APO (even field CP and odd field CI in FIG. 2).

Addressing of the DRAM memories of the FPM-type ("Fast Page Mode"), mentioned, for example in Patent Application WO 95/31874, is realized as follows. The data are stored in words of 64 bits by separating the chrominance and luminance information. Stored in a page of the DRAM memory (=512 words of 64 bits), and as shown in FIGS. 3 and 4, respectively, are:

the luminance information of 4 macroblocks $MB1i$, $MB2i$, $MB3i$, $MB4i$ of the odd field (denoted i) and the luminance information of 4 corresponding macroblocks $MB1p$, $MB2p$, $MB3p$, $MB4p$ in the even field (denoted p);

the chrominance information of 8 macroblocks of the odd field and the chrominance information of 8 corresponding macroblocks in the even field.

This organization allows the following types of access, without any page jumps:

access to the rows of macroblocks: 4 consecutive luminance macroblocks (8 for chrominance);
access to the rows of pixels: 4*16=64 consecutive luminance pixels (64 for chrominance);
access to the even/odd macroblocks: such an access is possible, because due to its construction, they are on the same page of the DRAM memory.

However, this addressing only relates to current DRAM memories. Other types of memories, the SDRAM memories, described, for example in the document "Synchronous dynamic RAM", B. Prince et al., IEEE Spectrum, 29 (1992), Oct., nr. 10, pages 44 to 49 (these synchronous DRAM memories make use of one synchronous interface: the inputs and outputs of the data are clock-synchronized), seem to be used more and more as replacements, particularly because of their higher transfer speed.

SUMMARY OF THE INVENTION

It is an object of the invention to provide a decoding device in which a memory addressing operation is defined which allows the use of an arbiter module capable of controlling memories of both the DRAM-FPM type and the SDRAM-type, i.e. allowing the use of the same modes of communication with other modules.

To this end, the invention relates to a device as described in the opening paragraph, which is characterized in that said device is compatible with an arbiter for synchronous DRAM or SDRAM memories arranged in two independent banks of 2048 physical pages of 256 16-bit words, the access to said SDRAM memories being effected in a page mode of 4 words of 16 bits and with an alternate addressing of each of the two banks for storing luminance and chrominance information in such conditions that the luminance information of 4 macroblocks of the odd field (or even field) of a DRAM-FPM memory page is evenly divided into the two banks in a SDRAM memory and, for each bank, into two successive pages of these banks, and that the chrominance information of 8 macroblocks of the odd field (or even field) of a DRAM-FPM memory page is evenly divided into the two banks in a SDRAM memory and, for each bank, into two successive pages.

In the decoding device thus proposed, the addressing method carried out proves to be adapted to the SDRAM memories, while compatibility with the solution based on the DRAM memory is guaranteed and the communication between the arbiter and the other modules is not modified (for passing from one type of DRAM memory to the other, it is sufficient to change the arbiter in the decoding device, while the modules which communicate with it remain unchanged). Moreover, the modified operations in this arbiter for controlling the conversion of the address suitable for addressing said synchronous DRAM memories are very simple and thus inexpensive.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

Figure 1:
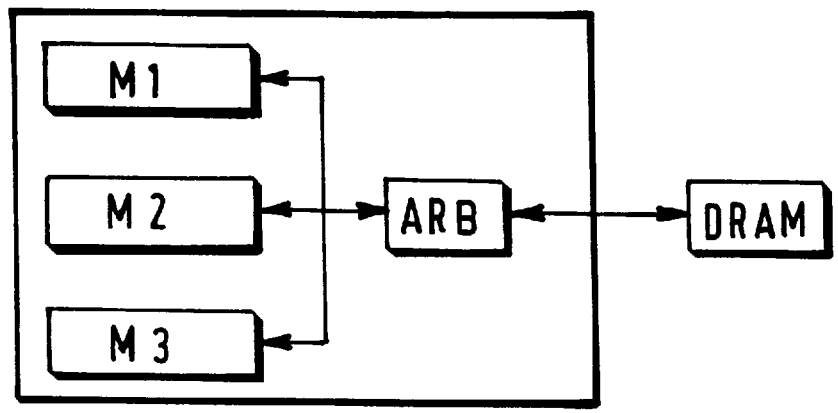
FIG. 1 shows the role of the memory interface fulfilled by the arbiter module in an MPEG2 decoder.
Figure 2:
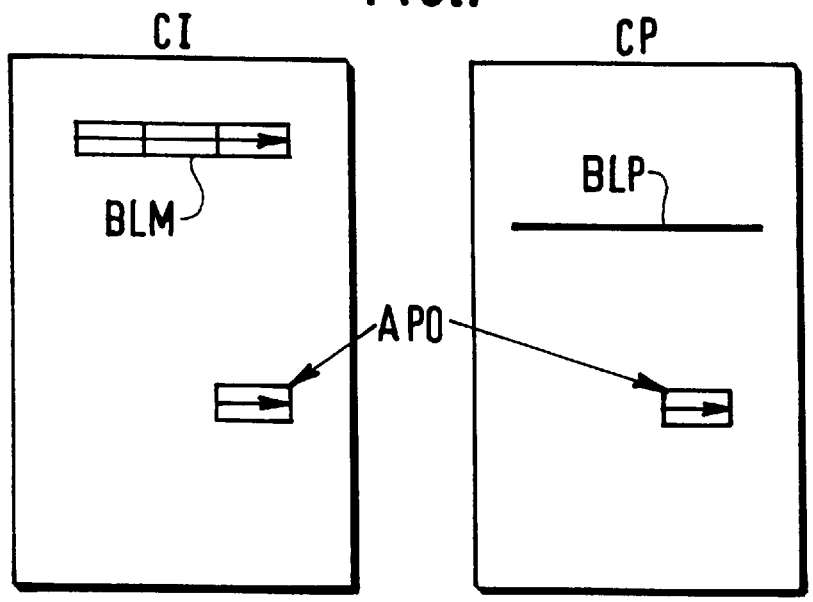
FIG. 2 illustrates different types of access to the decoded images in the image memory, and FIGS. 3 and 4 relate to addressing of luminance and chrominance information, respectively, in a page of the memory of the DRAM-FPM type.
Figure 3:
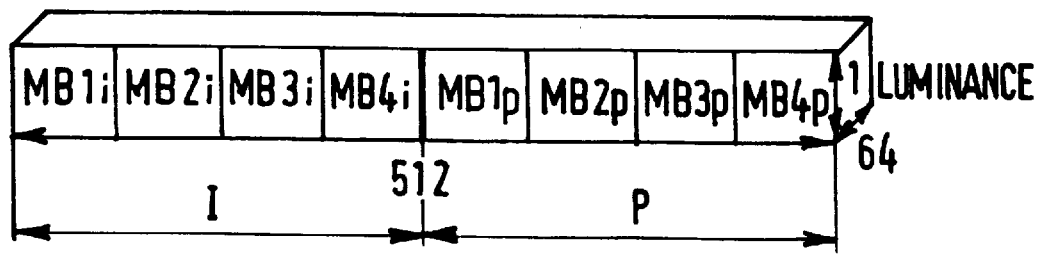
Figure 4:
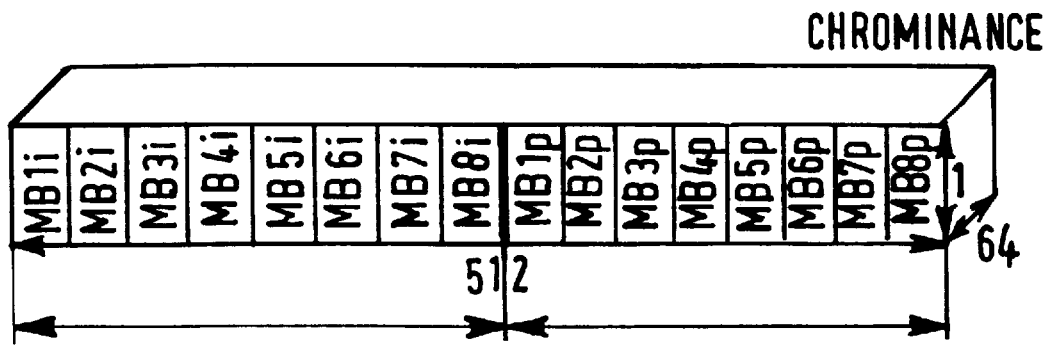

In the decoding device according to the invention, the arbiter is now not only able to control an external DRAM memory, but also a memory of the SDRAM-type. Storage of the luminance information, in the case of a page of the DRAM-FPM memory is illustrated in FIG. 3. One and the same page shows the luminance information of four macroblocks of the odd field (MB1$i$, MB2$i$, MB3$i$, MB4$i$) followed by that of the four corresponding macroblocks of the even field (MB1$p$, MB2$p$, MB3$p$, MB4$p$), the memory sub-assembly shown having the following size: 512×64×1 bits. Storage of the chrominance information, also in this case of a page of the DRAM-PFM memory, is illustrated in a similar manner in FIG. 4 showing, on the same page, the chrominance information of eight macroblocks of the odd field (MB1$i$ to MB8$i$) followed by that of eight corresponding macroblocks of the even field (MB1$p$ to MB8$p$), the sub-assembly thus shown having the same size of 512×64×1 bits as for the luminance information.

Figure 5:
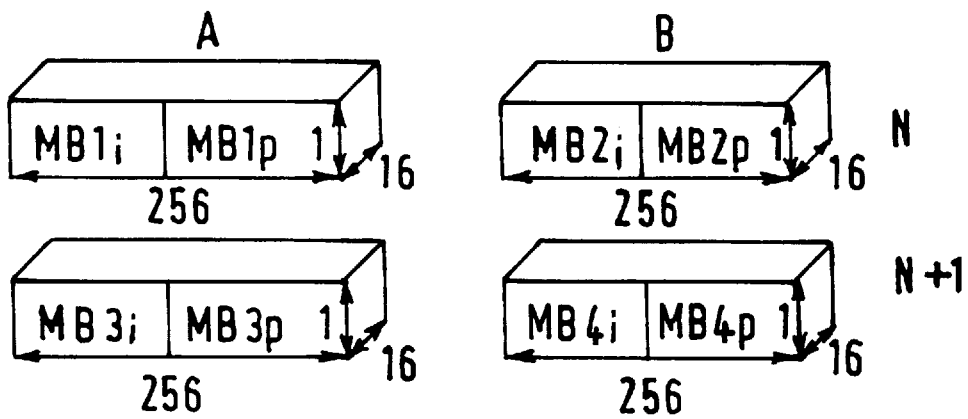
FIGS. 5 and 6 show the storage of the (respective) luminance and chrominance information of a page of the DRAM-FPM memory into four pages of the SDRAM memory in carrying out the invention.
Figure 6:
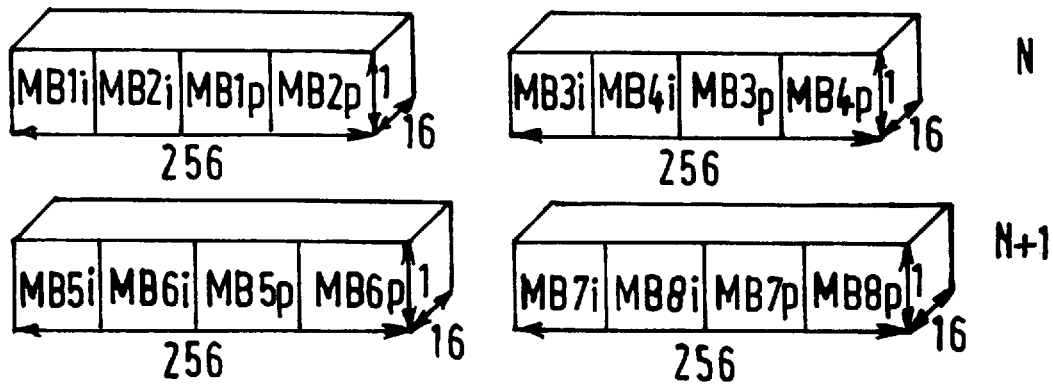

As compared with a DRAM-memory, a SDRAM memory is constituted by two independent banks A and B of 2048 physical pages each, and each physical page has a size of 256 16-bit words and is cut up into two logic memory pages (even and odd) of 128 16-bit words, i.e. one fourth of a logic page of the DRAM-FPM memory. Storage of the luminance and chrominance information is thus realized in a modified manner, as is illustrated in FIGS. 5 and 6, respectively. For the luminance information of four macroblocks of the odd field and the four corresponding macroblocks of the odd field (FIG. 5), there is now an even division into the two banks A and B of the SDRAM memory and, for each bank, into two successive pages N and (N+1) of these banks. The four corresponding subassemblies now each have a size of 216×16×1 bits and are rearranged as follows:

bank A, page N: odd and even macroblocks 1;
bank B, page N: odd and even macroblocks 2;
bank A, page (N+1): odd and even macroblocks 3;
bank B, page N+1): odd and even macroblocks 4; and so forth. Similarly, storage of the chrominance information for a SDRAM memory is now effected in the way as shown in FIG. 6, i.e. with the same arrangement divided into banks (A and B) and, for each bank, into pages (N, N+1). If the SDRAM memory is used in the "4-word page" mode, it is possible to pass from bank A to bank B and reciprocally without loss of time, if the access in each bank concerns at least 8 words of 16 bits (4 words for the first and last access).

To obtain a performance which is similar to that of a standard DRAM memory, the access operations are now organized as follows:

row of macroblocks: access operations possible to an unlimited number of macroblocks in a linear manner, because each group of two successive macroblocks is present in two opposed banks, the two successive access operations thus being performed without loss of time to jump a page:

row of pixels: in this case, 16 pixels per macroblock are read, so that it is possible to change banks without loss of the cycle, and the rows of pixels can be accessed in an unlimited manner;

even/odd macroblocks: access operations possible, because a macroblock and the corresponding macroblock of opposite parity are always in the same SDRAM memory page.

Figure 7:
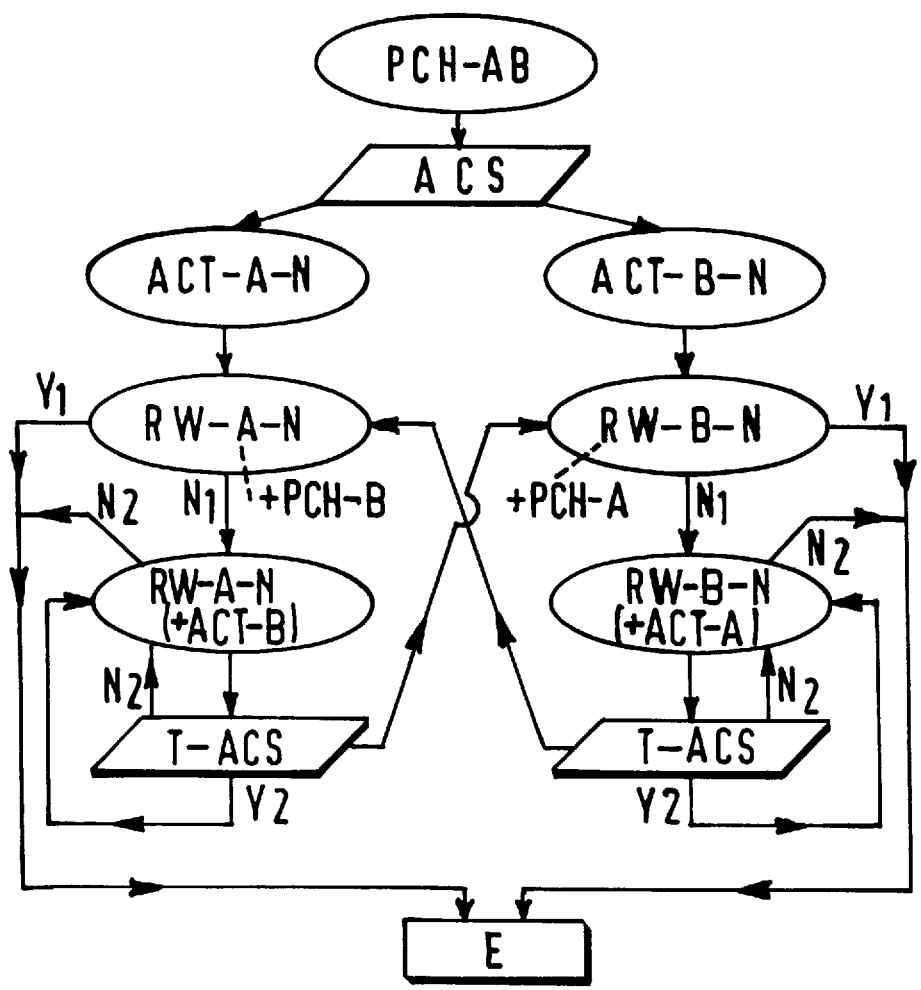
FIG. 7 is a flow chart of instructions illustrating for a SDRAM memory the control of changing the bank in an arbiter.

These different access operations with automatic changes of the bank as a function of the addresses to be read or written are illustrated in the flowchart of FIG. 7. The operations thus effected start by preloading the two banks (PCH-AB), followed by a first access operation or by the next considered access operation, denoted ACS. Dependent on whether the required access operation concerns a memory zone of the bank A or of the bank B, the corresponding bank (corresponding to the page concerned, for example, N) is activated (ACT-A-N, or ACT-B-N) and then the required reading or writing operation in this bank is effected (RW-A-N, or RW-B-N), while the other bank is preloaded. At the output, when the last access operation has been performed (connection Y1), the operations are terminated and the end of the access operation is denoted E in FIG. 7. If the access operation is not the last (connection N1), a new reading or writing operation in the same bank is effected, with a simultaneous activation of the other bank (ACT-B or ACT-A). A test is then performed (T-ACS) so as to determine whether a subsequent required access operation is concerned or whether it is the last access operation. In the first situation (connection Y2), the bank B is ready and there may be a loop-back, as the case may be, to the reading/writing operation in the bank A or B, page N, with the activation of the other bank. In the second situation (connection N2), the operations are terminated (end of access operation E). In order that the principle functions properly, there should be two consecutive access operations in the same bank, except for the last access operation or for a single access operation.

Figure 8:
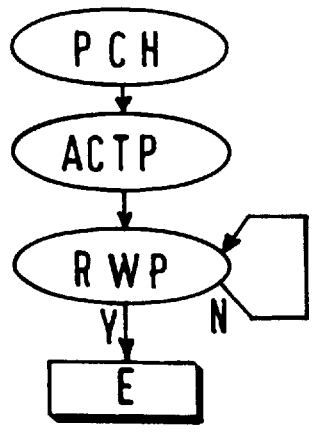
FIG. 8 shows a similar flowchart in the case of current DRAM memories.

This control by the arbiter of the access operations with changes of the banks in the SDRAM memory may be compared with the similar control in the case of a DRAM-FPM memory, illustrated in FIG. 8 and comprising the following simple operations: preloading (PCH), activation of a page N(ACTP), reading/writing in this page (RWP), test (Y/N) of the last access operation, with a readdressing operation if the response is negative, or end of access operation (E) if the response is positive.

For compatible use with a DRAM-FPM memory or a SDRAM memory, the invention described does not only relate to the arbiter in the MPEG decoder. In order that the selection of the memory effectively used does not effectively relate to this module only, the size of the access operations is limited to the size of those which are possible when using the DRAM-FPM solution, while a linear addressing at 18 bits is internally preserved between the arbiter and the other modules, the arbiter using these 18 bits of the internal address in the case of controlling access to the DRAM memory for giving the numbers of the page and the columns, and in the case of controlling access to the SDRAM memory, for selecting the bank, the number of the page, the parity of the field and the word of 64 or 16 bits. The address bus between the modules and the arbiter is unchanged. The arbiter effects a processing operation on this bus as a function of the type of connected DRAM memory:

if, for example, A[17:0] is the size of the address bus sent by the modules to the arbiter, the latter interprets the bus for a DRAM-FPM memory in the following way:

A[17:9]=number of the page and A[8:8]=number of the column;

for a SDRAM memory, for example: A[5]=selection of the bank, A[17:8,6]=number of the page, A[7]=even/odd selection (either columns 0 to 127, or columns 128 to 255, upper or lower part of the page) and A[4:0]= selection of the word of 64 bits.

I claim:

1. A device for decoding encoded digital signals of the MPEG-type, comprising different modules ($M_1$, $M_2$, $M_3$, . . . ) including at least an audio module and a video module, provided for communicating with an external random-access memory of the DRAM-FPM type via an interface module referred to as arbiter and intended to control the different types of access—to a row of pixels, a row of the MPEG macroblock or a macroblock in fields of opposite parity—to decoded images, characterized in that said device is compatible with an arbiter for synchronous DRAM or SDRAM memories arranged in two independent banks of 2048 physical pages of 256 16-bit words, the access to said SDRAM memories being effected in a page mode of 4 words of 16 bits and with an alternate addressing of each of the two banks for storing luminance and chrominance information in such conditions that the luminance information of 4 macroblocks of the odd field (or even field) of a DRAM-FPM memory page is evenly divided into the two banks in a SDRAM memory and, for each bank, into two successive pages of these banks, and that the chrominance information of 8 macroblocks of the odd field (or even field) of a DRAM-FPM memory page is evenly divided into the two banks in a SDRAM memory and, for each bank, into two successive pages.

* * * * *